Aug. 31, 1965
J. B. JONES
3,203,215
ULTRASONIC EXTRUSION APPARATUS
Filed June 5, 1961
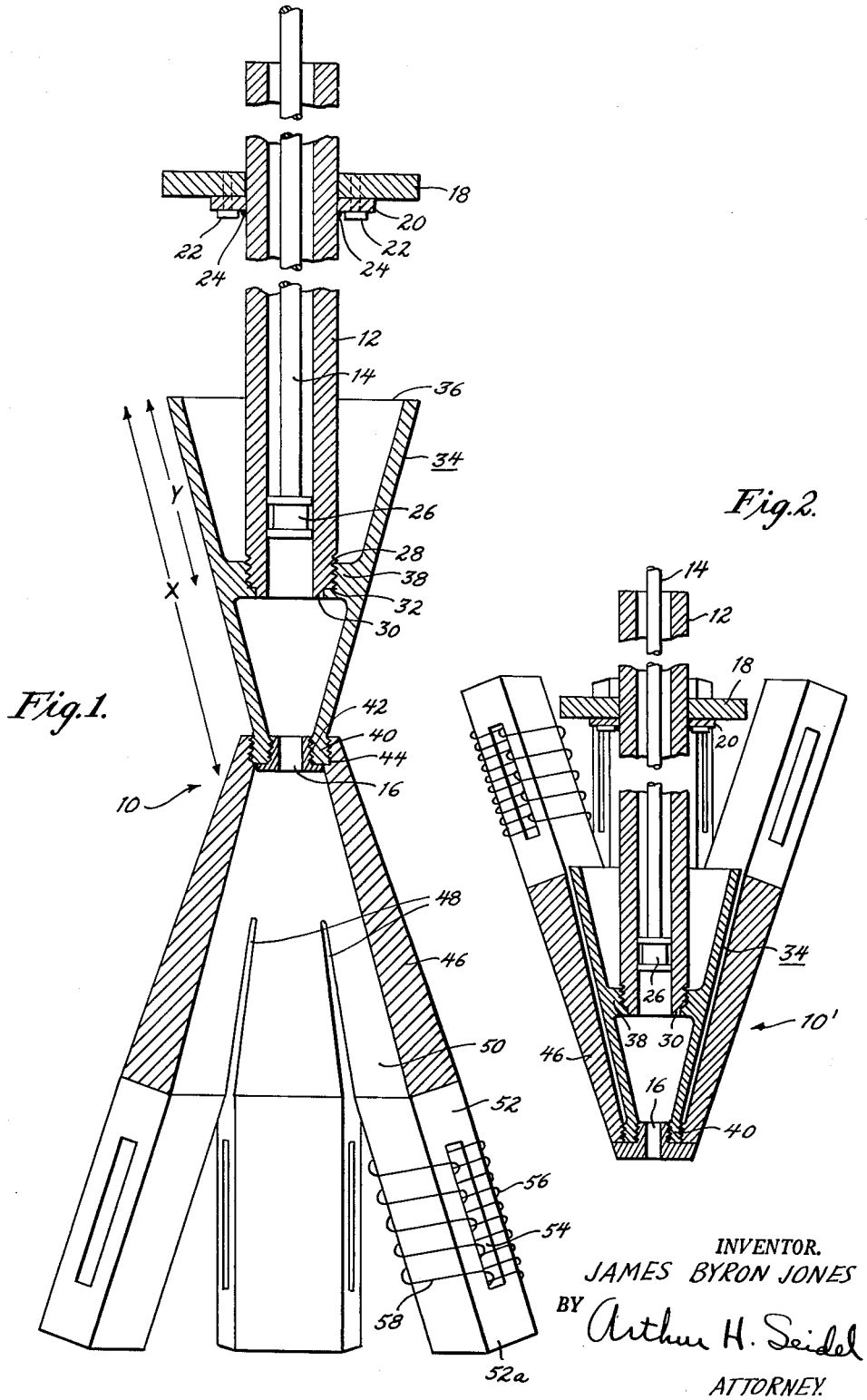
INVENTOR.
JAMES BYRON JONES
BY Arthur H. Seidel
ATTORNEY.

United States Patent Office 3,203,215
Patented Aug. 31, 1965

3,203,215
ULTRASONIC EXTRUSION APPARATUS
James Byron Jones, West Chester, Pa., assignor to Aeroprojects Incorporated, West Chester, Pa., a corporation of Pennsylvania
Filed June 5, 1961, Ser. No. 114,836
7 Claims. (Cl. 72—253)

The present invention is directed to an ultrasonic extrusion apparatus, and more particularly to ultrasonic extrusion apparatus whereby a material may be extruded through a die under high pressure while simultaneously being subjected to the application of ultrasonic energy.

This invention has as an object the provision of a novel ultrasonic extrusion apparatus.

This invention has as yet another object the provision of an ultrasonic extrusion apparatus in which a material may be extruded through a die under pressure which may be enormous, while the die and a portion of a force-insensitive mount are subjected to ultrasonic vibration.

This invention has as a still further object the provision of a novel support which minimizes undesirable system effects, such as damping, frequency shift, and the like.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a longitudinal sectional view through the ultrasonic extrusion apparatus of the present invention, with parts being cut away.

FIGURE 2 is a longitudinal sectional view of an alternative embodiment of the apparatus shown in FIGURE 1.

Referring to FIGURE 1 of the drawing, the ultrasonic extrusion apparatus of the present invention, is designated generally as 10. The apparatus 10 comprises a cylinder 12, a ram 14, and a die 16.

The cylinder 12 is mounted within the head member 18, which is secured to an external support. In this manner the ultrasonic extrusion apparatus 10 is fixedly supported in position. A mounting plate 20, which embraces the cylinder 12, is secured by bolts 22 to head member 18. The mounting plate 20 is secured by means of welding or brazing 24 to the cylinder 12. The apertures in the mounting plate 20 and head member 18 mate so that these elements provide rigid support for the cylinder 12.

The cylinder 12 may be provided with means for heating the billet which is received within it. Such heating means may be any of the conventional heating means utilized for this purpose, such as electric filament cartridges, gas flame means, etc.

The ram 14 comprises a rod of metal or other suitable material having fixedly secured to its innermost end a loosely fitting ram head 26 of somewhat larger cross-sectional diameter than the cross-sectional diameter of the ram 14 itself.

The outermost end of the ram 14 may be engaged with the hydraulic cylinder of a hydraulic press by conventional coupling means (not shown). A wide variety of standard means may be used to effect the coupling of the ram 14 with the press, and it is, of course, to be understood that a wide variety of presses and means for exerting pressure may be utilized in conjunction with the ultrasonic extrusion apparatus of the present invention.

The innermost end of the cylinder 12 is threaded on its outer surface at 28. Preferably, also, the innermost tip 30 of the cylinder 12 is provided with a wall of reduced thickness, so that a shoulder 32 is provided at the innermost end of the threaded portion 28.

The die 16 is coupled to the cylinder 12 by the mount designated generally as 34. The mount 34 is of the general type referred to as an Elmore mount, such mount being generally described in United States Letters Patent 2,891,178; 2,891,179; and 2,891,180 issued June 16, 1959 in the name of William C. Elmore.

However, the mount 34 shown in the accompanying drawings, while being of the general type described in the aforesaid Elmore patents, and in particular United States Letters Patent 2,891,180, is specifically a novel embodiment of the Elmore mount, as will be set forth below.

The mount 34 should be dimensioned in such fashion that it is a resonant member having a length (for the length of the mount 34 see the dimension designated "$x$") which is equal to an even multiple of one-quarter wavelength long according to the properties of the material of which the mount is made, and the frequency at which the mount is vibrated. The mount 34 is, as shown in the drawing, a generally conical member provided with an imperforable continuous wall between its uppermost and lowermost ends. The uppermost end 36 of mount 34 is free from attachment. This establishes a node, when the mount is subjected to vibration, at one-quarter wavelength from the uppermost free end 36, or at odd unit multiples of one-quater wavelength in the case of relatively long mounts. Thus, the support flange 38 of mount 34 is positioned the distance designated "$y$" from the uppermost free end 36, which is one-quarter wavelength or odd unit multiples of one-quarter wavelength, such as three-quarter wavelengths, five-quarter wavelengths, etc. from the uppermost free end 36 of the mount 34. The innermost bore surface of the support flange 38 is matingly contoured in respect to the cylinder 12. Thus, it is provided with threads which matingly engage the threads 28 on the cylinder 12, and with a counterbore so that a mating shoulder is provided for the shoulder 32 on the cylinder 12. Since the support flange 38 is positioned at a node on the mount 34, there will be no "leakage" of vibratory energy from the support flange 38 of the mount 34 to the cylinder 12.

The lowermost end 40 of mount 34 is offset from the conical taper of the remainder of the mount and is threaded both internally and externally. The internal threads 42 at the lowermost end 40 of mount 34 provide for threaded engagement with the die 16. The external threads 44 of mount 34 provide for threaded engagement with the coupler 46.

The coupler 46 is of generally conical nature and is slotted at its lowermost end to provide slots 48 which define a series of horns 50, on each of which is carried a magnetostrictive transducer 52. The magnetostrictive transducer 52 is silvered soldered, brazed or the like to the free end of its contiguous horn 50.

The coupler 46 and the transducers 52 comprise vibrating means which, in the apparatus of the present invention, are employed to vibrate the die 16.

The magnetostrictive transducer 52 for each of the horns 50 is formed from a magnetostrictive metal, such as nickel, the alloy 2–V Permendur (an iron-cobalt alloy), a nickel-iron alloy, or Alfenol (an aluminum-iron alloy), properly dimensioned to insure axial resonance with the frequency of the alternating current applied thereto, so as to cause it to change in length according to its coefficient of magnetostriction. The coupler 46 is likewise properly dimensioned to insure axial resonance at the operating frequency of the magnetostrictive transducers. Transducers of the aforesaid type constitute a preferred embodiment for operation at frequencies of up to about 75,000 cycles per second.

In place of metallic magnetostrictive materials, the transducer may comprise almost any material which has good physical properties and which changes its physical dimensions under the influence of an electric potential. Thus, it may comprise a piezoelectric ceramic, such as barium titanate, or lead zirconate, or a natural piezoelectric material, such as quartz crystals. Such materials are preferably used at high frequency operations, as at frequencies above 75,000 cycles per second. The transducer may also consist of an electromagnetic device, such as that which actuates a radio loudspeaker.

Each of the magneostrictive transducers 52 in the illustrated embodiment comprises a laminated core of nickel or other magnetostrictive metallic material, and has a rectangularly shaped opening 54 in its center portion. For the sake of clarity, only the coil structure of magnetostrictive transducers 52a at the righthand side of the drawing will be described herein, but it is to be understood that the construction of the remaining magnetostrictive transducers 52 is similar to it. The magnetostrictive transducer 52a includes a polarizing coil 56 and an excitation coil 58 which are wound about the laminated nickel core through the opening 54. Upon variations of the magnetic field strength of the excitation coil 58, there will be produced concomitant variations in the dimension of the transducer 52a, provided the polarizing coil 56 is charged at a suitable level with D.C. current, with the frequency of the aforesaid variations, namely the expansion and/or contraction of the magnetostrictive transducer 52a being generally equal to the frequency of the alternating electric current flowing in the excitation coil 58.

Inasmuch as each of the excitation coils 58 of the magnetostrictive transducers 52 may, if necessary, be connected to the same source of high frequency alternating current, and each of the transducers 52 are dimensioned similarly, the transducers 52 will deliver vibratory energy of the same frequency in phase to their respective horns 50 of coupler 46.

The dimensioning of the magnetostrictive transducers 52 and the coupler 46 should, as above-indicated, be regulated. Preferably, the total length of these elements should be an even number of one-quarter wavelengths, such as the transducers dimensioned to be equal to one-half wavelength, and the coupler 46 dimensioned to be equal to one-half wavelength.

It is to be emphasized that when in the aforesaid specification dimensioning to particular quantities of a wavelength are given, what is referred to is acoustical dimensioning. For example, in the case of the mount 34, the linear dimensioning of a one-half wavelength mount may not be the same on either side of the support flange 38, although the acoustical dimensioning will be. Thus, the presence of additional mass, provided by increased thickness or due to the conical section, may require the reduction in the linear length to produce a comparable acoustical length. This may be deliberately done to a considerable extent, see the type mount and dimensioning equations set forth in United States Letters Patent 2,891,178.

The apparatus 10' in FIGURE 2 is identical with the apparatus 10 except that the mount 34 is surrounded by the transducers 52. The embodiment in FIGURE 2 provided for easy access to the die 16, for observation of the material as it passes out of the die 16, and for easy removal of the extruded material.

The operation of the ultrasonic extrusion apparatus 10 and 10' of the present invention is as follows:

The ultrasonic extrusion apparatus 10 of the present invention may be utilized in conjunction with the extrusion of a wide variety of materials, such as metals, alloys, plastics, carbon, ceramics, etc. If a metallic material is to be extruded, it may be introduced as a metal billet into the cylinder 12. If the material to be extruded is non-metallic, it is usually introduced in a form other than a billet. Then the material is compressed by means of the ram 14 through the die 16. While being compressed due to the pressure exerted by the ram 14, the material will conform to the space within the mount 34 formed between the support flange 38 and the die 16. To achieve particular results, and to accommodate to particular materials, the shape and size of such chamber may be varied. The clearance between the ram head 26 and the cylinder wall within the bore of the cylinder 12 may also be varied depending upon the material being extruded.

From the interior of the mount 34 the material being extruded is forced through the opening within the die 16. While within such opening, it is subjected to the ultrasonic vibrations delivered from the transducers 52 through the coupler 46 into the die 16. In general, the design of the transducers is associated with the general dimensions of the extrusion cylinders and dies that are to be used. Large extruders will usually operate at low frequencies and small extruders may be operated at either low or high frequencies depending upon the transducer coupling array utilized. By "ultrasonic" as used herein is meant to include vibration having a frequency in the range of about 30 cycles per second to about 300,000 cycles per second. Thus, the vibration frequency may be within or beyond the audible sound range.

The application of ultrasonic or vibratory energy to the die 16 and a portion of the mount 34 simultaneously with the extrusion of the material through the die 16 is productive of a number of most beneficial results. Thus, the surface finish of the material being extruded through the die 16 may be appreciably enhanced. The amount of pressure required to extrude material through a die may be lowered. This will permit, in some cases, materials to be extruded which cannot economically or efficaciously be extruded by existing techniques. In cases where the same pressure is used with the apparatus of the present invention as formerly used, the rate of extrusion for a given material may be markedly accelerated.

Generally, the application of frequencies within the range of 30 cycles per second to 300,000 cycles per second is operative. For specific applications, particular frequency ranges within this operative frequency range may be preferred.

Since the mount 34 is tapered, it is not likely to exhibit radial resonance. If one section of the mount 34 will excite into radial resonance, the larger cross-section above it and the smaller cross-section below it will tend to suppress the undesired node.

Considerable work has been done using mixtures of alumina 38900 and water with the addition of ammonium alginate as a plasticizer, using the ultrasonic extrusion array mounted on a Wilson 25-ton hydraulic press. In some instances where no extrusion whatever could normally be effected with loads as high as 25 tons, ultrasonic activation immediately initiated extrusion. In other instances, extrusion forces were decreased and extrusion rates increased, using as little as from 250 to 1000 watts of power input to the transducer. This ultrasonic application also permitted substantial reduction in the amount of water and/or plasticizer required to extrude ceramic materials. For example, the results obtained with alumina containing 0.2 weight percent plasticizer using ultrasonics were superior to those produced without ultrasonics using 1.5–2.0 weight percent plasticizer. Furthermore, marked improvement in surface finish has been obtained with such ultrasonic application.

In the case of carbon materials, it is possible to extrude formulations containing far less volatiles than can be extruded by normal methods, and this is important because the amount of volatiles in the carbon control the duration of the heat treating cycle to which the product is exposed before being sold to the customer. Said heat treating cycle can, in fact, involve weeks of time in a high-temperature oven.

The force required for the extrusion of lead at a constant rate was reduced by utilizing 150 to 500 watts of power and initial forces for the extrusion of aluminum were similarly reduced by utilizing 1200 or more watts of power.

The present invention may be embodied in other specific forms without departing from the spirit or essential attributes thereof and, accordingly, reference should be made to the appended claims, rather than to the foregoing specification as indicating the scope of the invention.

I claim:

1. Apparatus including a cylinder, a die in communication with the interior of said cylinder, a movable member within said cylinder for urging material into said die, vibrating means for vibrating said die, and a mount, said mount comprising a resonant member engaging said cylinder and said die, said mount having a length equal to even multiples of one-quarter wavelength long according to its geometry and the properties of the material of which the mount is made and its frequency of operation, one end of said mount being free from attachment, a flange extending inwardly from the inner peripheral surface of said resonant member, said flange being positioned at a node on said resonant member spaced an odd unit multiple of one-quarter wavelength according to the geometry and properties of the material of which the mount is made and its frequency of operation from said one end, with said inwardly extending flange being engaged with said cylinder, and with the other end of said mount being coupled to said vibrating means.

2. Apparatus in accordance with claim 1 in which the die is spaced from the adjacent end of the cylinder, with the mount providing a duct for communication between the cylinder and the die, and with the other end of the mount being secured to both the vibrating means and the die.

3. Apparatus in accordance with claim 2 in which said resonant member is a generally conical tubular resonant member.

4. Apparatus in accordance with claim 1 in which the vibrating means includes a resonant coupler secured at one end to the other end of the mount, and the other end of said coupler being engaged with elements for generating vibratory energy.

5. In an extrusion apparatus comprising a cylinder, a force-insensitive mount having an inwardly directed member intermediate its ends, means securing said member to said cylinder adjacent one end thereof, one end of said mount being spaced from said one end of said cylinder, said mount providing a duct for communication between said one end of said cylinder and a die secured to said one end of said mount, and means for vibrating said die in the direction which extruded material will issue from said die.

6. In an apparatus in accordance with claim 5, wherein said cylinder, mount and vibrating means are on the same side of said die, whereby the issuance of material through said die is clearly visible.

7. Extrusion apparatus comprising a cylinder, a die spaced from one end of said cylinder, a resonant mount having one end secured to said die, said mount having a length equal to a unit multiple of one-half wavelength in the material of which the mount is made at the applied frequency, said mount having one free end, said mount having an inwardly directed member intermediate its ends secured to said cylinder adjacent said one end of said cylinder, said member being positioned an odd unit multiple of one-quarter wavelength from the free end of said mount, a portion of said mount between said inwardly directed member and said one end of said mount providing a duct between said cylinder and said die, and means for vibrating said die, said vibrating means being on the same side of said die as said mount and said one end of said cylinder, the construction and arrangement being such that said die is readily accessible and exposed to view.

References Cited by the Examiner

UNITED STATES PATENTS

| | | | |
|---|---|---|---|
| 2,891,180 | 6/59 | Elmore | 310—26 |
| 3,002,614 | 10/61 | Jones | 207—2 |

CHARLES W. LANHAM, *Primary Examiner.*

RICHARD H. EANES, *Examiner.*